United States Patent

[11] 3,599,229

[72] Inventor Charles N. Merrell
Plainview, N.Y.
[21] Appl. No. 662,657
[22] Filed Aug. 23, 1967
[45] Patented Aug. 10, 1971
[73] Assignee American Cyanamid Company
Stamford, Colo.

[54] APPARATUS FOR PRINTING IN CODED INKS AND RETRIEVING THE INFORMATION
6 Claims, 5 Drawing Figs.

[52] U.S. Cl. 346/75, 101/103, 101/366, 197/1
[51] Int. Cl. B41f 31/02, B41j 27/00, G01d 15/18
[50] Field of Search 235/61.11, 61.115; 250/71, 219 I; 346/75, 197/1; 101/103, 366

[56] References Cited

UNITED STATES PATENTS 3,105,908 10/1963 Burkhardt et al. 250/219 (I)
3,152,858 10/1964 Wadey 346/75
3,486,006 12/1969 Siegel 235/61.11 (S)

*Primary Examiner*—Maynard R. Wilbur
*Assistant Examiner*—Thomas J. Sloyan
*Attorney*—Samuel Branch Walker

ABSTRACT: Messages in coded inks in which the code is the presence or absence of photoluminescent components are effected by imprinting in spatially separated marking areas equal in number to the components, moving the marking areas one space and imprinting the coding components for a second symbol. As a result, no marking area will receive the same coded component corresponding to more than one symbol and some marking areas will receive coding components corresponding to more than one symbol. Retrieval is by ultraviolet illumination, photoluminescence of the components being received by separate detectors and the signals read out as symbols.

INVENTOR.
CHARLES N. MERRELL

BY Samuel Branch Walker

ATTORNEY

| | α | β | γ | δ | ε | φ |
|---|---|---|---|---|---|---|
| A | – | – | – | – | P | – |
| F | – | P | P | – | P | – |
| T | P | – | P | – | – | P |
| E | P | – | P | – | P | – |
| R | P | P | – | – | – | P |

INVENTOR.
CHARLES N. MERRELL
BY
Samuel Brack Walker
ATTORNEY

APPARATUS FOR PRINTING IN CODED INKS AND RETRIEVING THE INFORMATION

BACKGROUND OF THE INVENTION

In the patent of Freeman and Halverson, U.S. Pat. No. 3,463,027, Oct. 14, 1969, there is described a procedure for coding and retrieving information by using inks which have photoluminescent components photoluminescing in separate bands and which on illumination with ultraviolet light photoluminesce in different bands, at least a part of each band not overlapping other bands. The code is primarily the presence or absence or a particular component. This permits a number of distinct symbols, represented by $2^n-1$. Thus, for example, four components permit 15 different symbols, six components 63, and so on. The application also describes providing for a larger number of symbols by having each component absent or present in more than one concentration. Thus, for example, a particular component could be absent, present in a particular concentration, or present in double the concentration. In such a case the number of symbols possible is represented by $3^n-1$. The coded symbols may be printed in various ways and may constitute an invisible code or they may be associated with an ordinary typed symbol so that the message can be read with or without ultraviolet illumination. The Freeman and Halverson patent points out that advantageously some or all of the components may be very narrow band photoluminescers, such as various chelates of lanthanide ions having an atomic number more than 57. The coding by photoluminescent components has many advantages. Thus, for example, the code is in no sense limited to a particular shape of symbol. Thus the coded ink imprints may be small areas of any particular shape either with one ink containing the appropriate mixture of components or with appropriate single component inks in small marks closely clustered within the marking area, or actually as overlays. This presents the great advantage that any accidental, partial mutilation of a symbol does not ordinarily destroy the coded response. This is in marked contrast, for example, to the magnetic ink used for account numbers and other symbols on bank checks. If a symbol is somewhat mutilated, it may be falsely read.

Effective as the coding of the Freeman and Halverson patent is, there is still room for improvement in certain respects. An important practical problem is the intensity of the photoluminescence produced by the different components of the coded inks, and even when components of certain minimum photoluminescence efficiency are used, as is described in the Freeman and Halverson patent, there is never too much energy. When a symbol is illuminated with ultraviolet light, it becomes necessary to separate the resulting luminescence into a number of beams, each one directed to a single detector responding to a particular coding component. A convenient way to accomplish this separation is by means of achromatic beam splitting, however this is at the expense of serious attenuation in the energy available at the detectors. For example, let us assume a coded ink system involving six photoluminescent components, so that it is necessary to obtain six separate beams. Collecting the luminescence from a coded ink mark and directing it onto a noncoherent fiber optic faceplate, which has the faceplate fibers separated in a random manner into six bundles, provides roughly one-sixth the energy entering the faceplate in each of the separate bundles. Hence five-sixths of the energy in each luminescence band is discarded.

Another problem which arises when photoluminescent components are to be mixed on the substrate to form the code in a marking area is the cramped working space. The mechanical arrangement required to provide any specified combination of six photoluminescent components on demand in a small marking area is rather complex and any relaxation in this requirement is very useful.

SUMMARY OF THE INVENTION

According to the present invention, there are spatially separated printing mechanisms, one for each coding component. In the illustrative case with six coding components, there would be six. These can be mechanical devices arranged side by side which make deposits of coding components in marking areas spaced, for example, the width of a single symbol. In the description which will follow, the invention will be described in connection with a modified typewriter mechanism, although of course other symbol printing may be used since the present invention is not limited to any particular mechanical design of printing mechanism. A modified typewriter presents some advantages in that it is easy with suitable switches to have the typewriter type either in code alone, visible symbols alone, or a combination of both. In other words, the present invention has practically all of the advantages in this respect which the Freeman and Halverson invention presented except that somewhat more precise registration is required, and so constitutes an improvement thereover without involving any practically serious disadvantages for many uses.

When a particular symbol is printed, for example by actuating a keyboard of a modified typewriter, the particular key causes ink with one or other of the components to be imprinted in certain ones of the six marking areas, the spacing of course being that of the ordinary symbol on the typewriter. The typewriter carriage then moves one space from right to left and the next symbol causes printing of coded ink in the six areas which are, of course, displaced from the first six areas by one space. This operation will be clear from the description below of a preferred embodiment.

It will be noted that in each line there will be some additional spaces, one less than the number of coding components, i.e., five in the case of a typical six component code. This together with the registration requirements, constitute practically the only disadvantages of the present invention. The additional space is not a serious matter as coded inks are normally colorless and most documents which are typed have to have margins anyway which can contain the additional five spaces.

For readout it is convenient to have separate detector systems each sensitive to the particular photoluminescence bind of a component. These may be arranged in an alignment corresponding to the alignment of the printing mechanism, each having its own small lens, filter, detector, etc. Each detector receives a beam from a particular marking area, and there is no attenuation due to achromatic beam splitting. If the actual detectors are somewhat larger than a symbol space, which is the case with extremely sensitive photomultiplier tubes, the beams, after reaching the particular opening opposite each marking area, can be led by suitable means, such as fiber optics or other form of light pipes, to more widely spaced detectors. Where very small solid state detectors of sufficient sensitivity are used, a more compact design of readout apparatus is, of course, possible. Actually it is possible with small detector systems to mount them sufficiently close to the marking areas so as to render the individual small collecting lenses unnecessary.

Since the marking areas normally are close together, a single lens system can be used to collect the luminescence from the prescribed set of marking areas and to image them in an image space where means for distinguishing between marking areas is provided, as will be described below in one specific modification. This system has the advantage of greater working distance between marking areas and the readout mechanism, while retaining the same good radiation gathering power. Normally all of the prescribed set of marking areas will be illuminated with ultraviolet radiation simultaneously, so that all luminescent components for a given symbol can be sensed at the same time.

It also is possible to sense all luminescent components in one marking area at a time, storing the information in a simple storage unit until all marking areas associated with a given symbol have been sensed, and then reading out the distributed code. While this reading modification is not preferred, because it retains the attenuation incident to beam splitting, it does have the advantage of increased working space for the imprinting step. It may happen that a reader is available which tests for the presence of all luminescent components in a single marking area at a time, such as would be used with the ordinary Freeman and Halverson code, and only a rather simple addition of the memory device is necessary to allow it to read the distributed code of the present invention. While this adds to the flexibility of the present invention, the preferred form of readout is the one in which each marking area is examined only for a single component at a time.

DESCRIPTION OF THE PREFERRED EMBODIMENTS

In the following description a typical six-component coding system will be described, and in order to avoid confusion with letter symbols, each component of the code will be represented by a Greek letter from $\alpha$ through $\epsilon$, with the sixth component represented by $\Phi$. For purposes of one particular typical illustration, the six components may be as follows: $\alpha$ is a tris chelate of samarium with 1,1,1,2,2-pentafluorohep-tane(3,5)dione with trioctylphosphineoxide as a synergic agent. $\beta$ is a dysprosium doped yttrium vanadate, the dopant being present as 0.6 percent. $\gamma$ is a tris chelate of europium and symmetrical hexafluoroacetylacetone with the same synergic agent, $\delta$ is an ytterbium doped yttrium vanadate, $\epsilon$ is a tris chelate corresponding to $\alpha$ but of terbium instead of samarium, and $\Phi$ is a neodymium doped yttrium vanadate.

Figure 1:
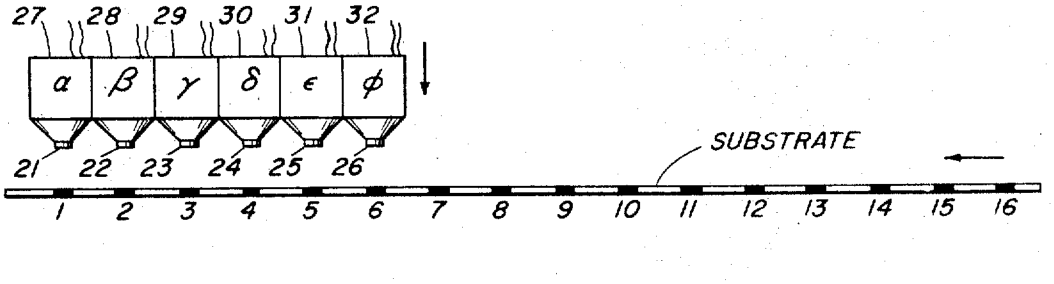
FIG. 1 is a diagrammatic representation of a portion of an imprinting mechanism including the printing heads.

In FIG. 1 a substrate, such as a part of a line on typewriter paper is labeled with 16 marking areas (1) to (16). The printing device has six printing heads (21), (22), (23), (24), (25) and (26), each one printing an ink with a single coding component as labeled on the drawing. Actuation is diagrammatically shown through pairs of wires (27) to (32) respectively. Electrical signals can be produced in the wires by conventional signal sources, such as for example a typewriter keyboard of the general type shown in U.S. Pat. No. 2,751,433. As the signal generation is conventional, the typewriter keyboard is not shown.

Figures 5, 6:
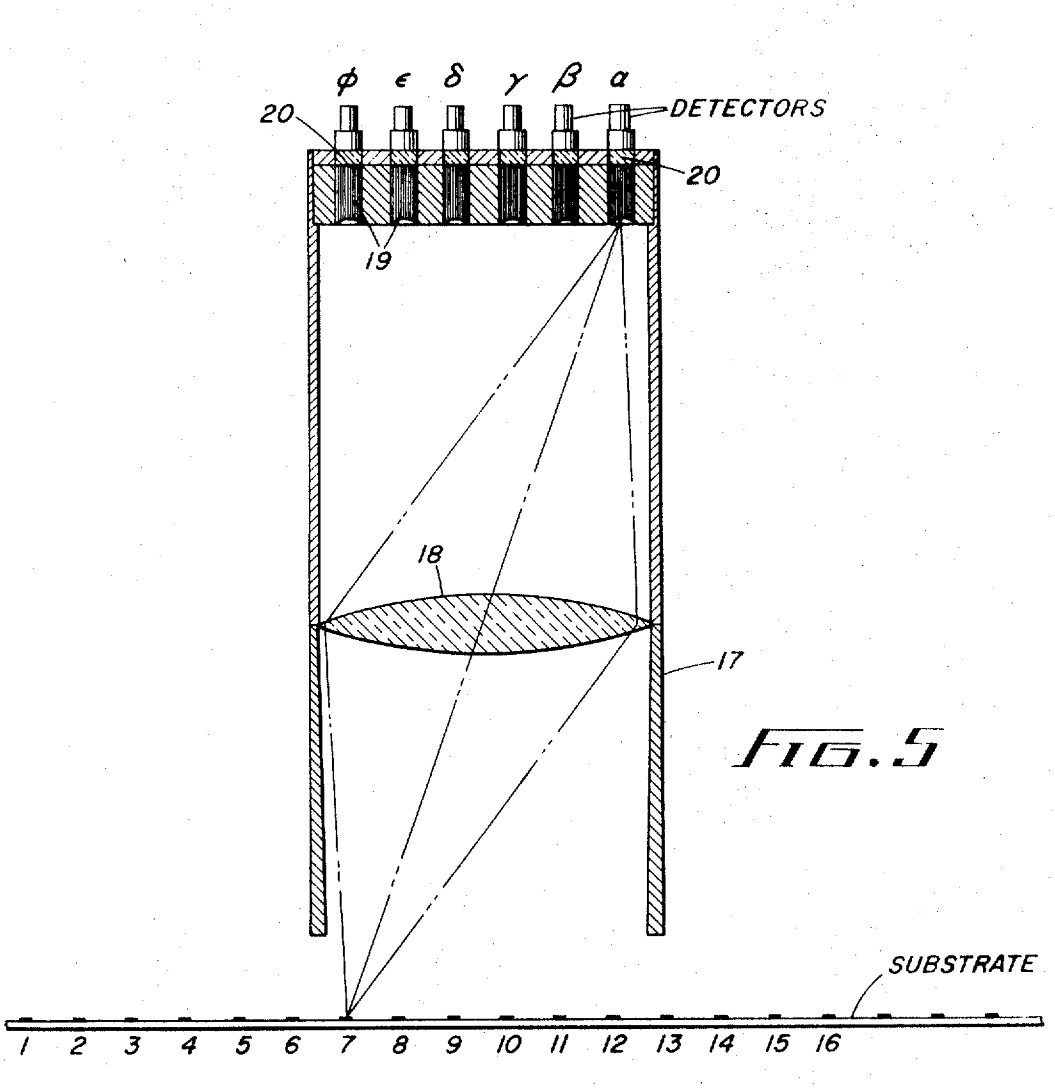
FIG. 5 is a cross section through a modification in which single imaging optics are used with multiple detectors.
FIG. 6 is a tabular representation of a representative coding for a typical English word "

FIG. 6 shows a typical code for alphabet letters occuring in the word "AFTER." Presence or absence is indicated by "P" and "—" respectively. First a key for A is struck, and this energizes hammer (25) through wires (31). In other words, there will be a print in the ink containing component $\epsilon$ in the marking area (5). The typewriter then spaces one, the paper moving from right to left, and now instead of marking spaces (1) to (6) being opposite hammers (21) to (26) respectively, marking space (2) is opposite hammer (21) and so on, marking space (7) being opposite hammer (26). The letter F is then struck. As will be seen from FIG. 6, this causes hammers (22), (23) and (25) to strike in spaces (3), (4) and (6). The typewriter paper then moves another space to the left, the letter T is struck, and so on until the word AFTER has been typed in the code shown in FIG. 6. This will result in the following conditions in the first ten marking areas, coding components being shown in the parentheses: 1(—), 2(—), 3($\beta$, $\alpha$), 4($\gamma$, $\alpha$), 5($\epsilon$, $\gamma$, $\alpha$), 6($\epsilon$, $\gamma$, $\beta$), 7(—), 8($\Phi$, $\epsilon$), 9(—), and 10($\Phi$).

It will be seen that after the word is typed, there would be code markings not only in the five marking spaces corresponding to the five letters of the word but five additional marking spaces 6 to 10. This continues until the right hand margin is reached, the five additional marking spaces in some or all of which coded marks may be present from the last letters typed on the line. As has been pointed out above, the coded inks are colorless and therefore the margin does not have confusing marks. However, the typewriter may have an ordinary ribbon so that the letters will be typed in visible form as well as in code.

Figure 2:
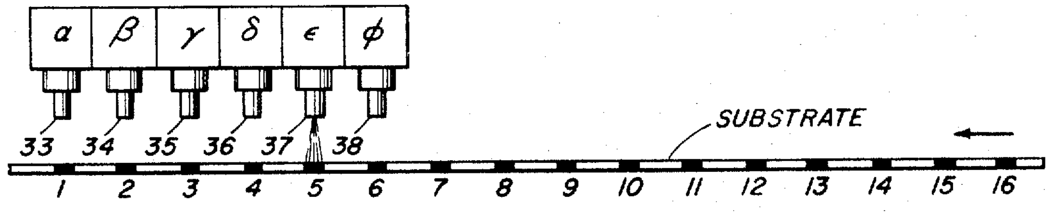
FIG. 2 is a horizontal section through a modified printing head using jets.

FIG. 2 shows an arrangement similar to FIG. 1, but instead of there being type hammers there are six tiny jet orifices (33), (34), (35), (36), (37) and (38). Since, as will be seen, each jet is separated by a full spacing and only one jet strikes a single marking area at any one time, the risks of interference between jet streams with spattering are eliminated for all practical purposes. As a result no marking area will have received any part of a jet of ink component intended as part of the code for another letter. Of course after the paper has moved and another key is struck, there may be another mark in a marking area which received a mark for the previous letter. It will be noted that in no case will there by two marks of the same ink in any one marking space.

Figure 3:
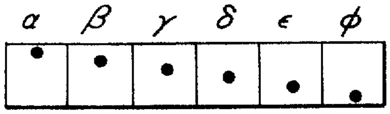
FIG. 3 is a diagrammatic representation of the surface of an imprinting head with spatially separated means for depositing individual coding components shown as black circles.

Because the ink can be formulated to dry very quickly, there is little risk of contaminating one hammer with ink from an impression made previously with another hammer, still the risk is not completely nonexistent even though such contamination would introduce so little of the previous marking ink that ordinarily there would be no confusion. If it is desired to eliminate completely any such possibility, the tiny impression areas of the hammers may be staggered vertically as is shown in FIG. 3. Each impression is shown as a black dot, and if there are several impressions in the same marking area they will be spatially separated and so even the practically negligible problem of contamination does not exist. Of course when the modification in FIG. 2 is employed, using jets this contamination problem does not arise and, therefore, staggering of the jets is not necessary, although it does no harm. Indeed it may actually assist in more efficient use of exciting radiation during the reading step.

Figure 4:
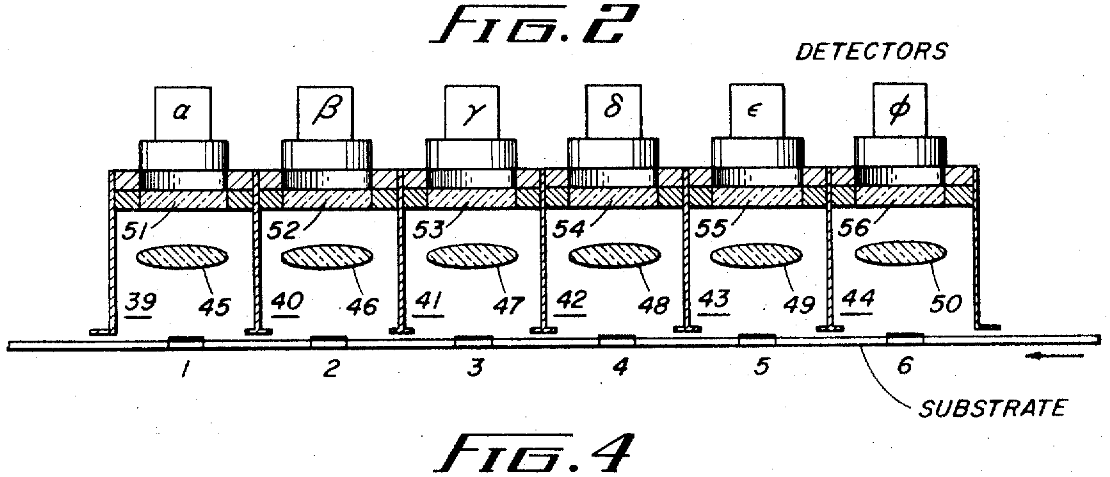
FIG. 4 is a simplified semidiagrammatic isometric view of a readout mechanism using separate optics for each detector.

The readout of an imprinted message can be made very simply with the apparatus shown diagrammatically in FIG. 4. Here there are openings (39) to (44) arranged spatially in the same manner and sequence as the printing elements in FIGS. 1 and 2. In each opening there is a lens, labeled from (45) to (50) respectively, back of which is a filter labeled respectively (51) to (56). The filters pass the bands corresponding to the photoluminescent radiation from components $\alpha$ to $\Phi$ respectively. Back of the filters there may be detectors or light pipes to more distant detectors which can be spread further apart. As the nature of the detectors is well known and is not changed by the present invention, they appear only as rectangles labeled with the letter of the component in question. This modification is very simple but does require six lenses and a certain modest degree of correct register with the spaces on the paper where the coded message is imprinted. Obviously, of course, the output from the detector must be interpreted, which can be in a simple rudimentary form of computer with a simple program.

The number of lenses can be reduced by the modification shown in FIG. 5. Here the paper with marking areas is shown after there has been some readout from the first six marking areas. Areas (7) to (12) are under a readout barrel (17) with a lens (18). The set of six marking areas from (7) to (12) is of course illuminated at one time with ultraviolet light, as must be done in connection with FIG. 4, also. Since this illumination is of conventional form and would only confuse the drawing, it is not shown in either of the figures. Six light guides (19) are present in the top of the readout cylinder and they lead to six filters (20), behind which the detectors are located. They are shown only by the letter label for the particular component. As the marking areas are quite close together there is no problem in imaging six of them at a time onto the plane of the light guides (19). Each area will be imaged on a single light guide, as is shown for area (7) which is imaged on the far right light guide (19) leading finally to the detector for component $\alpha$. In a similar manner the marking area (8) is imaged on the light guide (19) leading to the detector responding to component $\beta$ and so on. Signals from the detectors are fed into a conventional readout storage unit, (not shown). Then the paper moves on one space. Now area (8) will luminesce and the beam will be imaged on the light guide in front of the detector for $\alpha$, area (9) on $\beta$, and the like. As the paper moves on, area by area, each marking area will be investigated for photoluminescent radiation from one component only. The only difference between FIGS. 4 and 5 lies in the arrangement of the optics. It should be noted that in FIG. 5 the light guides (19) are shown as being quite short and straight, but of course in a practical device it is often desirable to have the light guides spread out so that larger but more sensitive radiation detectors, such as photomultiplier tubes, may be used. FIG. 5 is purely diagrammatic and the physical placement of the light guides, such as fiber guides, is effected in accordance with the object desired and the particular placement, of course, forms no part of the present invention. It will be noted that in FIG. 5 the ends of the light guides are quite widely separated, and therefore the risk of improper registration of marking areas does not arise so that one marking area does not radiate to more than one light guide. The optical arrangement in FIG. 5 allows greater latitude in selection of optical parameters, particularly the magnification in the image space, as compared to the arrangement in FIG. 4. This has a certain operating advantage.

The great increase in sensitivity effected by the present invention, in which there is no attenuation in the individual beams due to achromatic beam splitting, can sometimes be used to achieve results which might not be practical or which might not be as reliable with the former processes used. Thus, for example, if it is desired to increase the number of symbols by using each coded component in three levels: absent, level 1 and level 2, which may be twice as great a concentration, the energy may be so low with the losses in beam splitting that the readout is not as reliable as when the code simply provides for presence or absence of a component. Nevertheless, there is a demand for a larger number of symbol choices. For example, with a six component system the 63 symbols possible with presence of absence coding will provide for all of the letters of the alphabet, the digits, some punctuation marks or other symbols, but only for one case; in other words, it would be necessary to type in all capitals or all small letters. If it is desired to have both cases, the symbol choice must be somewhat greater than 63, and so if it is possible to use in the coding presence of a particular component in more than one concentration, a considerably larger number of choices becomes possible. Thus, for example, if two concentrations can be used, the number of choices is $3^n-1$, and with six components this would give 728 symbols, which is more than ample. It might be thought that it would be a simple matter to retain the more reliable presence and absence coding with an additional component, that is to say, seven instead of six, which would give 127 symbols, ample for alphanumeric representation with two cases for the letters. However, this also involves a certain problem because the number of photoluminescent materials which will photoluminesce strongly with sufficiently separated bands is definitely limited, and so the increase in energy which is possible in the preferred form of the present invention opens up the possibility for a wider choice of symbols with only six components, or for that matter an adequate number with only five components. On the other hand, if the increase in energy efficiency is used in the presence or absence coding method, a still greater precision and sensitivity results.

Where it is desired to use the present invention for multiple concentration coding, it is in general preferable to use the jet modification of FIG. 2, as of course the coding signal from the keyboard can easily be designed to spray out a larger or smaller amount of ink. While not insoluble, the problem becomes more difficult with printing hammers of the type shown in FIG. 1.

I claim:

1. In an apparatus for recording information which prints symbols sequentially in a single predetermined direction and codes several areas of a carrier or substrate designated marking areas, the code consisting in absence or presence, in at least one concentration, on or in a substrate of photoluminescent compounds which luminesce under ultraviolet illumination, the improvement which comprises means for simultaneously imprinting deposits of selected coding components on selected, evenly spaced marking areas the plural area code for each printed symbol extending in the said single predetermined direction, each marking area positioned to receive only a single deposit at any one time, the number of marking areas being the same as number of coding components, the imprinting means for each component being aligned to imprint on only a single marking area different from those of the other components, each imprinting means having its own, self-contained supply of its own coding component, means for displacing the marking areas by the width of one marking area in the said predetermined single direction, and means for imprinting in the displaced marking areas coding components corresponding to a second symbol, and means for repeating the operation to a point on the substrate spaced from the edge by a number of marking areas one less than the number of components, whereby the last symbol can imprint coding component deposits in at least one of said spaces.

2. An apparatus according to claim 1 in which the means for imprinting consists of a plurality of jets of inks equal to the number of coding components.

3. An apparatus according to claim 2 including means for imprinting by the jets of inks in more than one quantity.

4. An apparatus according to claim 1 in which at least one of the self-contained supplies consists of a coding component comprising a complex of a lanthanide ion having an atomic number greater than 57.

5. An apparatus according to claim 1 in which different coding deposits in any one marking area are spatially separated in a direction other than the predetermined direction of the spacing of the marking areas.

6. An apparatus according to claim 1 in which the number of coding components is six.